(No Model.)
W. MILLS.
BATTERY ELEMENT.
No. 508,551. Patented Nov. 14, 1893.
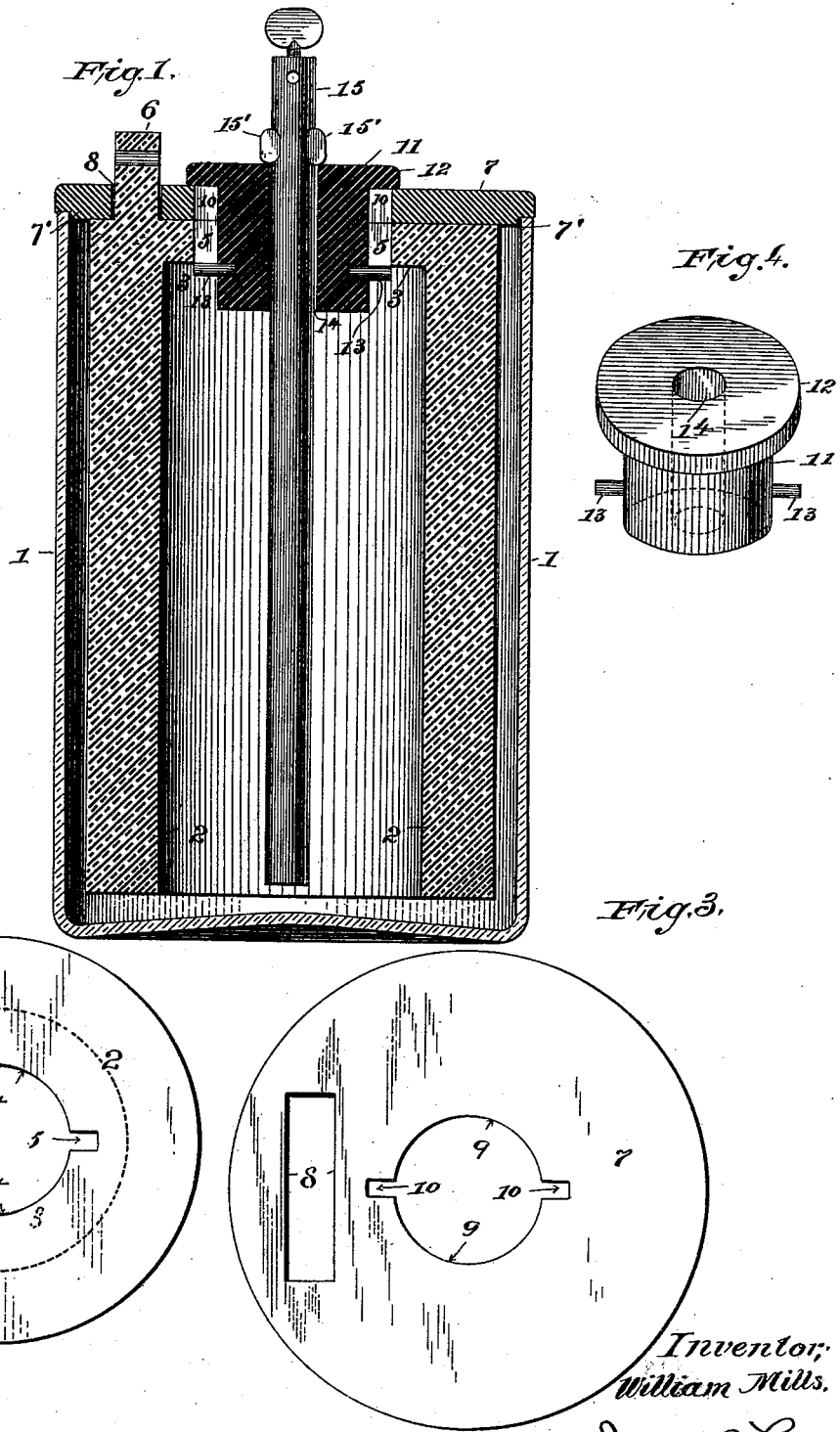

UNITED STATES PATENT OFFICE.

WILLIAM MILLS, OF ELIZABETH, NEW JERSEY, ASSIGNOR TO THE NEW YORK CARBON WORKS, OF NEW YORK, N. Y., AND NEWARK, NEW JERSEY.

BATTERY ELEMENT.

SPECIFICATION forming part of Letters Patent No. 508,551, dated November 14, 1893.

Application filed October 18, 1892. Serial No. 449,239. (No model.)

*To all whom it may concern:*

Be it known that I, WILLIAM MILLS, a citizen of the United States of America, residing at Elizabeth, county of Union, State of New Jersey, have invented certain new and useful Improvements in Battery Elements, of which the following is a specification.

My invention has for its object the support of a carbon element in the cell from the top of said cell, and comprises devices for insulating the carbon element from the cell and from the positive element.

My invention is shown as applied to a cylinder of carbon supported within a cell by an added cover, with the positive zinc element suspended from the cover within the carbon element.

My invention resides in the construction and arrangement of parts shown in the accompanying drawings and further set forth in the specification and claims, of which—

Figure 1 is a sectional elevation of the complete battery cell, showing my improved element; Fig. 2, a plan of the carbon element; Fig. 3, a plan view of the supporting cover; Fig. 4, a perspective view of the bushing.

Same numerals of reference refer to like parts throughout the several views.

In the drawings 1 is the usual glass containing cell, and 2 the carbon cylinder which is closed by the head 3, in which an opening 4 is formed. Extending outwardly from said opening are slots 5. The carbon cylinder 2 is provided with an outwardly extending lug 6, to which the binding post may be attached, although this is not essential.

7 is the cover made of some insulating composition, such as hard rubber or the like, and which is provided with a slot 8 to permit the lug 6 of the carbon cylinder to protrude through it, and which is also provided with an opening 9 and outwardly extending slots 10, the opening 9 preferably being of the same diameter as the opening 4 of the carbon. The cover is provided with a shoulder 7' to keep it in place.

The slots 5 and 10 are diametrically opposed. Thus far it will be seen that the carbon element and the cover are separate and distinct instrumentalities. These two parts are united together for the purpose of supporting the carbon within the cell by the hereinafter described means.

A bushing 11 of non-conducting material, such as a cork, rubber or other equivalent material, which has a projecting ledge 12, outwardly extending pins 13, which are preferably made integral with the bushing and of the same material, and a central aperture 14 through which the zinc rod 15 passes, is adapted to be inserted in the openings 4 and 9 in the carbon and cover, respectively. The pins 13 on the bushing 11 are adapted to pass through the slots 5 and 10 in the cover 7 and carbon 2, and when the parts are in the position shown in Fig. 1, a partial rotation of the bushing will bring the pins 13 under the head 3 of the carbon, binding the cover, carbon and bushing together, so that the carbon can be supported from said cover on the top of the cell, and the parts insulated one from the other. The bushing 11 should preferably fit the openings 9 and 4 air tight, and the ledge 12 cover the slots 5 and 10, so as to prevent evaporation in the cell. The zinc 15 is provided with outwardly extending lugs 15', for supporting the zinc, but this feature I do not claim herein.

The projection 6 and slot 8 are not essential features of my invention, and may be eliminated if desired.

Many changes may be made in the construction and location of parts herein without departing from the spirit of my invention.

What I claim is—

1. The combination with the negative electrode, and a detachable non-conducting cover for supporting the same within a cell, of a positive electrode, and means for detachably uniting the cover and negative element, said means insulating the positive and negative electrodes and the cover from each other, substantially as described.

2. In an electric battery, the negative electrode consisting of a carbon cup provided with an insulated detachable cover, and a detachable bushing of insulating material passing through the cover and carbon cup, with a hole therein for the reception of the positive electrode, the said cover extending over the cell for the purpose of supporting the carbon within the same, substantially as described.

3. The combination of a carbon cup 2 having the apertured head 3, of the cover 7 of larger diameter than the carbon and detachable therefrom, and means for uniting the carbon cup and the cover, substantially as described.

4. The combination of the carbon cup 2, having the head 3, opening 4 and slots 5, the detachable cover 7 larger in diameter than the carbon cup, having a central opening 9 and slots 10, with the bushing 11 provided with outwardly extending pins 13 adapted to engage with the head 3 of the carbon cup and means for detachably securing the bushing to the cover, substantially as described.

5. The combination of the carbon cup 2 having the head 3, aperture 4 and slots 5 in the head, a detachable cover 7 larger in diameter than the carbon cup, having the aperture 9 and slots 10, and the bushing 11 having the ledge 12 and pins 13, the ledge 12 engaging the top of the cover, and the pins 13 being adapted to pass through said slots and engage the under portion of the head 3, substantially as described.

Signed at the city of New York, county of New York, and State of New York, this 11th day of August, 1892.

WILLIAM MILLS.

Witnesses:
JOSEPH L. LEVY,
BENEDICT S. WISE.